UNITED STATES PATENT OFFICE 2,548,257

PARA-HIPPURYLAMIDO SALICYLIC ACIDS AND DERIVATIVES AND PROCESS OF MANUFACTURE

Alan August Goldberg, Hampstead, London, and Norman Leslie Thomas, Shepton Mallet, England, assignors to Ward, Blenkinsop & Company Limited, London, England, a British company No Drawing. Application July 2, 1949, Serial No. 102,954. In Great Britain July 2, 1948

9 Claims. (Cl. 260—519)

This invention relates to the production of acyl derivatives of aminohydroxybenzene monocarboxylic acids and more especially to the production of the benzoyl and substituted benzoylamidoalkane carbonamido derivatives thereof.

The products produced in accordance with the present invention have the general formula

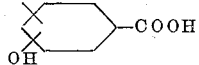

in which X is a benzoyl or substituted benzoyl group and Y is hydrogen or an alkyl group or are salts thereof. More particularly, the invention comprises products which correspond to the general formula

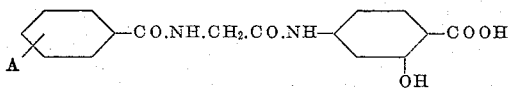

in which A stands for hydrogen, halogen or nitro, or are salts thereof.

The process in accordance with the invention for the production of a substance having the above general formula comprises treating an aminohydroxybenzoic acid or a salt thereof with the acid halide of a benzoyl or substituted benzoylamidoalkane carboxylic acid having the general formula

NHX.CH₂.COZ in which X is as above defined and Z is a halogen in the presence of an acid acceptor. Preferably the aminohydroxybenzoic acid or salt thereof is para-amino-salicylic acid or a salt thereof.

In one method of carrying out the process of the present invention an aqueous solution of a water-soluble salt, such as an alkali metal salt of the aminohydroxybenzoic acid is prepared and diluted with a water-soluble organic solvent such as acetone, methyl ethyl ketone or dioxane in which the acid halide is readily soluble. The acid halide, which may be dissolved in the same solvent, is then added portionwise, the reaction mixture being maintained neutral or slightly alkaline by additions of alkali. Substantially stoichiometric amounts of acid halide and alkali may be added substantially simultaneously to the reaction mixture. Any O-acyl derivative which may be formed is rapidly hydrolysed by the alkali present. Preferred alkali metal salts are those of sodium and potassium. The alkali which is added to the reaction mixture is preferably a caustic alkali and may be sodium or potassium hydroxide.

Alternatively the reaction may be carried out by the portionwise addition to a solution of the aminohydroxybenzoic acid in an organic base, such as pyridine or a picoline, which acts as an acid acceptor, of the acid halide. The product may be taken up in water and purified through an alkali metal salt thereof such as the sodium salt, by treatment with alkali or with a salt of a weak or readily displaceable acid therewith.

In either case the free acid may be liberated from the resulting reaction mixture by treatment with acid, preferably mineral acid, in sufficient amount to bring the final pH of the reaction mixture to about 3.

The acylating agent employed may be an hippuryl halide such as hippuryl chloride, a nuclear substituted hippuryl halide such as para-nitrohippuryl chloride or para-chlorohippuryl halide or a para-acylamidohippuryl halide such as para-acetamidohippuryl chloride.

The compounds produced by the process of the invention have been found to have useful pharmaceutical properties and to be useful intermediates in the production of substances possessing therapeutic properties.

The following examples illustrate the manner in which the invention may be carried into effect.

Example 1

20 parts of 4-amino salicylic acid is suspended in 500 parts of cold water and normal sodium hydroxide solution added with stirring until a clear solution having pH 7.5 is obtained. The solution is diluted with acetone and 26 parts of hippuryl chloride is then added portionwise to the stirred solution simultaneously with the addition of normal sodium hydroxide solution, the speed of addition of each being so regulated that the pH of the mixture is maintained at 8.0–8.5. After stirring for several hours more the acetone is removed under reduced pressure and the solution adjusted to pH 3.0 with hydrochloric acid in order to precipitate the 4-hippuramido salicylic acid as a white powder.

Example 2

46.4 parts of para-chlorohippuryl chloride (obtained by the action of phosphorus pentachloride and acetyl chloride on para-chlorohippuric acid) is added portionwise to a mixture of 31 parts of 4-aminosalicylic acid in 50 parts of dry pyridine. The mixture is allowed to stand overnight, then heated on the water bath for a short time, chilled and poured into 500 parts of cold water. The solid which separates is collected, dissolved in 20 parts of sodium bicarbonate and 1000 parts of boiling water, the solution filtered and allowed to cool; sodium 4-(p-chlorohippuramido) salicylate separates as a fine white powder. This is collected and stirred with 500 parts of cold water and a slight excess of dilute hydrochloric acid. The precipitate of 4-(para-chlorohippuramido)-salicylic acid M. P. 228° C. is collected, washed and dried at low temperature.

*Example 3*

25 parts of para-nitrohippuric acid is added portionwise over 30 minutes to a mixture of 26 parts of powdered phosphorus pentachloride and 180 parts of acetyl chloride. The mixture is then rapidly stirred with exclusion of moisture for 3 hours. The precipitate of para-nitrohippuryl chloride is collected, washed with ligroin and dried in vacuo; the yield is 19 parts M. P. 106–108° C. (Found: N, 11.8; Cl, 14.8.

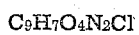

requires N, 11.5; Cl, 14.6%.

48 parts of para-nitrohippuryl chloride is added portionwise during one-half hour to a mixture of 31 parts of p-aminosalicylic acid and 50 parts of dry pyridine. After keeping at room temperature overnight the mixture is heated on the water bath for 1 hour, cooled and ground up with 500 parts of water. The solid is collected, dissolved in 500 parts of water and 20 parts of sodium bicarbonate and the hot solution filtered with charcoal. The filtrate is acidified with dilute hydrochloric acid and the precipitate of 4-(para-nitrohippuramido) salicylic acid collected, washed and dried at low temperature; the yield is 44 parts of an orange coloured powder, M. P. 215–218° C. (decomp.). (Found: M, 359; N, 11.6. $C_{16}H_{13}O_7N_3$ requires M, 359; N, 11.7%.)

We claim:

1. As new products hippurylamido hydroxybenzoic acids having the general formula

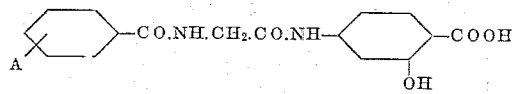

in which A is selected from the group consisting of hydrogen, halogen and nitro, and salts thereof.

2. As new products 4-hippurylamidosalicylic acid and alkali metal salts thereof.

3. As new products 4-(para-chlorohippurylamido) salicylic acid and alkali metal salts thereof.

4. As new products 4-(para-nitrohippurylamido) salicylic acid and alkali metal salts thereof.

5. A method of preparing a hippurylamido salicylic acid having the general formula

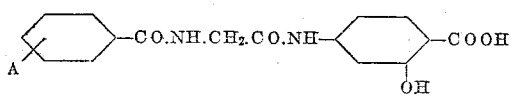

in which A is selected from the group consisting of hydrogen, halogen and nitro which comprises preparing an aqueous solution of a salt of para-aminosalicylic acid and adding portionwise thereto an acid halide of a hippuric acid carrying the substituent A as defined above and alkali so as to maintain the reaction medium slightly alkaline and thereafter acidifying the reaction medium.

6. A method of preparing a hippurylamido salicylic acid having the general formula

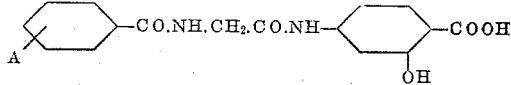

in which A is selected from the group consisting of hydrogen, halogen and nitro which comprises preparing a solution of para-amino-salicylic acid in an organic base which acts as an acid acceptor and adding portionwise thereto an acid halide of a hippuric acid carrying the substituent A as defined above, converting the product to an alkali metal salt by treatment with an aqueous solution of a substance selected from the group consisting of alkalis, salts of weak acids therewith and salts of easily displaceable acids therewith, and acidifying the resulting solution.

7. A method of preparing 4-hippurylamido salicylic acid which comprises preparing an aqueous solution of an alkali metal salt of para-aminosalicylic acid, portionwise adding thereto a hippuryl halide and alkali at such rates that the reaction medium is maintained slightly alkaline and thereafter adding acid until the pH of the medium is substantially 3.

8. A method of preparing 4-(para-chlorohippurylamido) salicylic acid which comprises preparing a mixture of para-aminosalicylic acid and a tertiary organic base, portionwise adding thereto an acid halide of para-chlorohippuric acid, treating the product with water and an alkali metal bicarbonate, separating the alkali metal salt thus formed and acidifying said salt.

9. A method of preparing 4-(para-nitrohippurylamido) salicylic acid which comprises preparing a mixture of para-aminosalicylic acid and a tertiary organic base, portionwise adding thereto an acid halide of para-nitrohippuric acid, treating the product with water and an alkali metal bicarbonate, separating the alkali metal salt thus formed and acidifying said salt.

ALAN AUGUST GOLDBERG.
NORMAN LESLIE THOMAS.

REFERENCES CITED

The following references are of record in the file of this patent:

UNITED STATES PATENTS

| Number | Name | Date |
|---|---|---|
| 2,135,474 | Sachs | Nov. 1, 1938 |

FOREIGN PATENTS

| Number | Country | Date |
|---|---|---|
| 90,809 | Switzerland | Jan. 2, 1922 |
| 91,109 | Switzerland | Jan. 16, 1922 |
| 522,788 | Germany | Apr. 15, 1931 |

OTHER REFERENCES

Zahn, Beilstein (Handbuch, 4th ed.), vol. 14, p. 578 (1931).